Aug. 16, 1932. H. R. BATES 1,872,024
PROCESS FOR PRODUCING FERTILIZING MATERIAL
Filed April 5, 1929
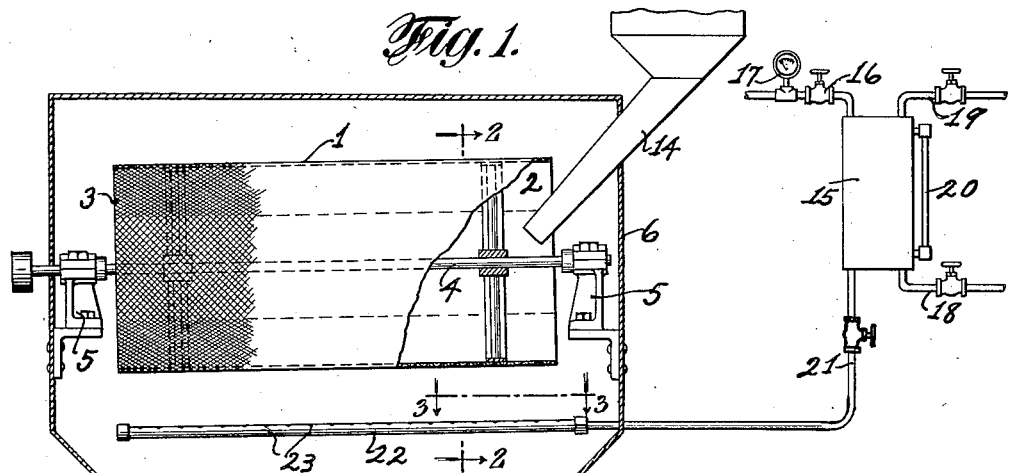
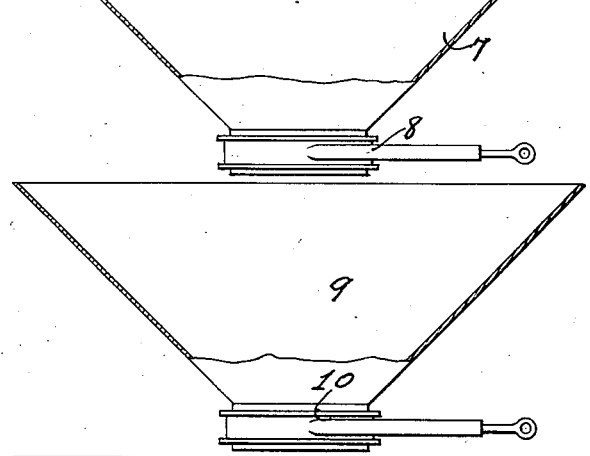
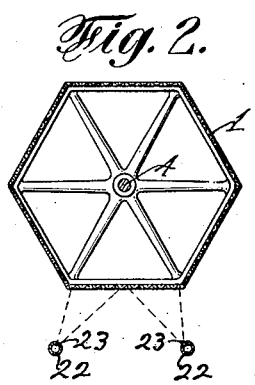
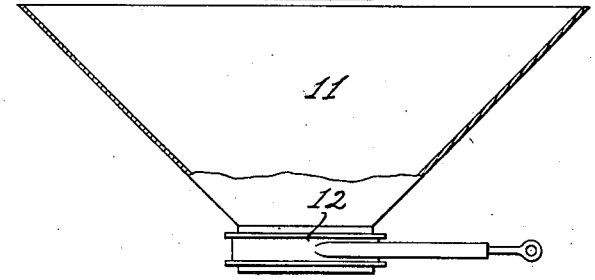
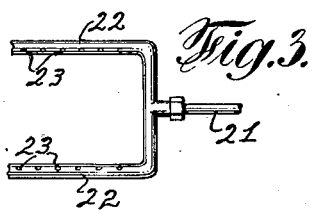
INVENTOR
Harry R. Bates
BY
Clifford, Seuel & Burgess
ATTORNEYS Patented Aug. 16, 1932

1,872,024

UNITED STATES PATENT OFFICE

HARRY R. BATES, OF ATLANTA, GEORGIA, ASSIGNOR TO INTERNATIONAL AGRICULTURAL CORPORATION, OF NEW YORK, N. Y., A CORPORATION OF NEW YORK

PROCESS FOR PRODUCING FERTILIZING MATERIAL

Application filed April 5, 1929. Serial No. 352,632.

This invention relates to a process and apparatus for applying liquid ammonia or anhydrous ammonia to particles of acid phosphate and other fertilizer materials, such as superphosphate and complete fertilizers containing acid phosphate, so as to absorb the ammonia substantially entirely and make a mixture that is in a very desirable condition to be used.

Heretofore mixtures of liquid ammonia and acid phosphate have been made by bringing the materials together in a revolving mixer, for example, in which the materials were subjected to a rolling and mixing action. This method of mixing the acid phosphate and liquid ammonia caused the mixture to become very wet and sticky, due probably to the fact that by the intense agitation and mixing the water which was introduced in the ammonia liquor was brought to the surfaces of the particles after it had been absorbed by the acid phosphate particles.

In carrying out this invention particles of acid phosphate or fertilizers containing acid phosphate are dropped by gravity out of contact with each other and streams or jets of ammonia liquor or anhydrous ammonia are projected upwardly preferably at an angle to the falling particles, thus bringing the ammonia into contact with the particles, whereupon the ammonia becomes rapidly and satisfactorily absorbed by the acid phosphate particles. The term "ammonia liquor" will be used to include anhydrous ammonia.

The particles, after having absorbed the ammonia, may be passed through a series of cones one above the other to mix the particles. The contacting of the falling particles and the liquid ammonia is preferably carried out in a housing or enclosed space. The acid phosphate and ammonia liquor are contacted in measured amounts, and it has been found that the ammonia is so completely absorbed by this process that obnoxious ammonia fumes do not escape to any appreciable extent.

The invention will be understood from the description in connection with the accompanying drawing in which Fig. 1 is a vertical section through an illustrative embodiment of an apparatus for carrying out the invention; Fig. 2 is a section taken along the line 2—2 of Fig. 1; and Fig. 3 is a plan view of one of the details taken along the line 3—3 of Fig. 1.

In the drawing reference character 1 indicates a revoluble hollow elongated screen that may be made of hexagonal or other shapes in cross section. The screen is mounted to slope slightly from the inlet end 2 to the outlet end 3. The shaft 4 of the screen is mounted upon bearings 5 and may be driven in any convenient way.

A housing 6 surrounds the screen and is provided at its lower portion with a conically shaped outlet 7 with a valve 8 in the bottom thereof. A conically shaped hopper 9 is located below the valve 8 and is provided at its bottom with an outlet valve 10. Another conically shaped hopper 11 is mounted below the valve 10 and is provided with an outlet valve 12 at its bottom. A receptacle or container 13 is located below the valve 12.

A chute 14 extends from a source of supply of particles of acid phosphate which can be introduced into the revolving screen 1 at a fixed rate or in measured amounts.

A measuring tank 15 for liquid ammonia or an aqueous solution of ammonia is provided with a valved air pressure pipe 16 to which is attached a pressure gauge 17. A valved supply pipe 18 from a source of liquid ammonia enters the measuring tank 15 and a valved vent pipe 19 is provided at the top of the tank 15. The tank 15 is also provided with a liquid level gauge 20. A valved outlet pipe 21 extends from the lower portion of the tank 15 and is connected to branches 22 lying below the screen 1 and parallel to the axis thereof. The branches 22 are disposed on opposite sides of a vertical plane passing through the center of the screen. The branches 22 are each provided with a series of outlet holes 23 so disposed that the jets of liquid passing through these holes are projected upwardly and inclined toward each other.

The operation is as follows:

A measured quantity of acid phosphate particles is introduced through the chute 14 into the screen 1 and the particles are scattered over a considerable area as they pass through the openings in the screen and then fall separated from each other.

The tank 15 is filled with the desired amount of liquid ammonia by opening the valve in the pipe 18 and the valve in the vent pipe 19. These two valves are then closed and the valve in the outlet pipe 21, as well as the valve in the air pressure pipe 16, are opened, thus causing the liquid ammonia to be forced out in upwardly inclined jets through the holes 23 in the branches 22 to come into contact with the falling particles of acid phosphate. It has been found that the jets or sprays contacting with the falling particles of acid phosphate cause the ammonia to be rapidly and substantially completely absorbed by these particles. The particles, after absorbing the liquid ammonia, may collect in the lower conical portion 7 of the housing 6 and upon opening the valve 8 will drop into the cone 9 and collect therein until the valve 10 is opened, whereupon the particles will collect in the cone 11 and may at last be removed therefrom by opening the valve 12 to permit the particles to pass into the container 13. It has been found that the passage of the particles through the series of cones will cause the same to be mixed thoroughly, without causing them to become wet and sticky.

I claim:

1. The process which comprises dropping particles of acid phosphate downwardly and spraying ammonia liquor upwardly into contact with the falling particles.

2. The process which comprises dropping particles of acid phosphate downwardly and spraying ammonia liquor upwardly into contact with the falling particles in a closed space.

3. The process which comprises dropping particles of acid phosphate downwardly and spraying ammonia liquor upwardly into contact with the falling particles in converging streams.

4. The process which comprises scattering particles of acid phosphate downwardly over an extended area and projecting ammonia liquor upwardly into contact with the falling particles.

5. The process which comprises scattering particles of acid phosphate downwardly over an extended area and projecting ammonia liquor upwardly into contact with the falling particles in an enclosed space.

6. The process which comprises scattering particles of acid phosphate downwardly over an extended area, projecting ammonia liquor upwardly into contact with the falling particles, and afterwards causing said particles to approach each other and pass through a restricted opening.

7. The process which comprises scattering particles of acid phosphate downwardly over an extended area, projecting ammonia liquor upwardly into contact with the falling particles, and afterwards causing said particles to approach each other and pass through restricted openings in succession.

HARRY R. BATES.